(12) United States Patent
Hellberg et al.

(10) Patent No.: US 6,611,855 B1
(45) Date of Patent: Aug. 26, 2003

(54) FLEXIBLE AND EFFICIENT CHANNELIZER ARCHITECTURE

(75) Inventors: Richard Hellberg, Huddinge (SE); Anders Wedin, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/337,344

(22) Filed: Jun. 21, 1999

(51) Int. Cl.[7] .......................... G06F 17/15; G06F 17/14
(52) U.S. Cl. ........................................ 708/420; 708/405
(58) Field of Search ................................ 708/300, 321, 708/403–405, 420; 702/77; 709/224; 370/210; 324/76.19; 375/219

(56) References Cited

U.S. PATENT DOCUMENTS

| | | | |
|---|---|---|---|
| 4,636,972 A | 1/1987 | Boland | 708/321 |
| 5,270,953 A | 12/1993 | White | |
| 5,485,395 A | 1/1996 | Smith | 702/77 |
| 5,535,240 A | 7/1996 | Carney et al. | |
| 5,583,792 A | 12/1996 | Li et al. | 709/224 |
| 5,682,403 A | 10/1997 | Tu et al. | |
| 5,715,246 A | 2/1998 | Abdesselem et al. | |
| 5,799,046 A | 8/1998 | Hayashi | 708/300 |
| 5,890,106 A | 3/1999 | Bosi-Goldberg | 704/203 |
| 5,930,231 A | 7/1999 | Miller et al. | 370/210 |
| 6,247,035 B1 | 6/2001 | Hellberg | 708/420 |
| 6,266,687 B1 | 7/2001 | Leyonhjelm et al. | 708/420 |

FOREIGN PATENT DOCUMENTS

| | | |
|---|---|---|
| EP | 0 501 690 | 9/1992 |
| WO | WO 95/28045 | 10/1995 |
| WO | WO 95/33350 | 12/1995 |
| WO | WO 97/22220 | 6/1997 |
| WO | WO 98/24256 | 6/1998 |

OTHER PUBLICATIONS

R.E. Crochiere, et al., "Multitrate Digital Signal Processing", Prentice–Hall, Englewood Cliffs, XP002104475, Section 7.4, 1983, pp. 346–356.

S. Joseph Campanella et al., "A Flexible On–Board Demultiplexer/Demodulator", 1988, pp. 299–303.

S.K. Barton et al., "Simulation and Analysis of the Distortion Generated by the Bulk–FFT Demultiplexer", Signal Processing, vol. 54, 1996, pp. 285–294.

Swedish Patent Application No. 9802059-7, filed Jun. 10, 1998, "Digital Channeliser and De–Channeliser", R. Hellberg, pp. 1–29, Figs. 1–10.

Y.O. Al–Jalili, et al., "Distortion Analysis of the Buld FFT Structure for Multi–Carrier Demodulators", Signal Processing, vol. 42, 1995, pp. 215–219.

*Primary Examiner*—Tan V. Mai (57) ABSTRACT

A digital channelizer/de-channelizer architecture that, with a minimum amount of hardware, is capable of dynamically adapting to changing system requirements. Preferably, the digital channelizer/de-channelizer, which is applied with a modified fast convolution algorithm, includes a plurality of dedicated, optimized, pipeline modules that may be dynamically adjusted for allocating and handling different bandwidths, a flexible number of channels, and simultaneous multiple standards.

31 Claims, 7 Drawing Sheets

FLEXIBLE AND EFFICIENT CHANNELIZER ARCHITECTURE

BACKGROUND

The present invention relates generally to radio communication systems, and more particularly, to a flexible and efficient channelizer and de-channelizer architecture for use in a radio communication system.

The cellular industry has made phenomenal strides in commercial operations both in the United States and the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as to maintain high quality service and avoid rising prices.

In addition to the challenges posed by a need for greater system capacity, the designers of future mobile communication systems and base stations have their own unique set of challenges. For example, a well known challenge in the industry is the desirability to provide a cost-effective and dynamically flexible system. System designers are interested in providing a system that is capable of dynamically handling the co-existence of a variety of different standards (e.g., Frequency Division Multiple Access, Time Division Multiple Access, etc.), dynamically allocating a number of channels for each individual standard and simultaneously handling multiple bandwidths without substantially increasing the hardware for the system. This need for dynamic flexibility is important to many base station operations, from downloading an individual configuration file for a base station during startup to the ability to reconfigure a site to handle continuously changing conditions (e.g., changing standards) on a frame-by-frame or even slot-by-slot basis.

Figure 1:
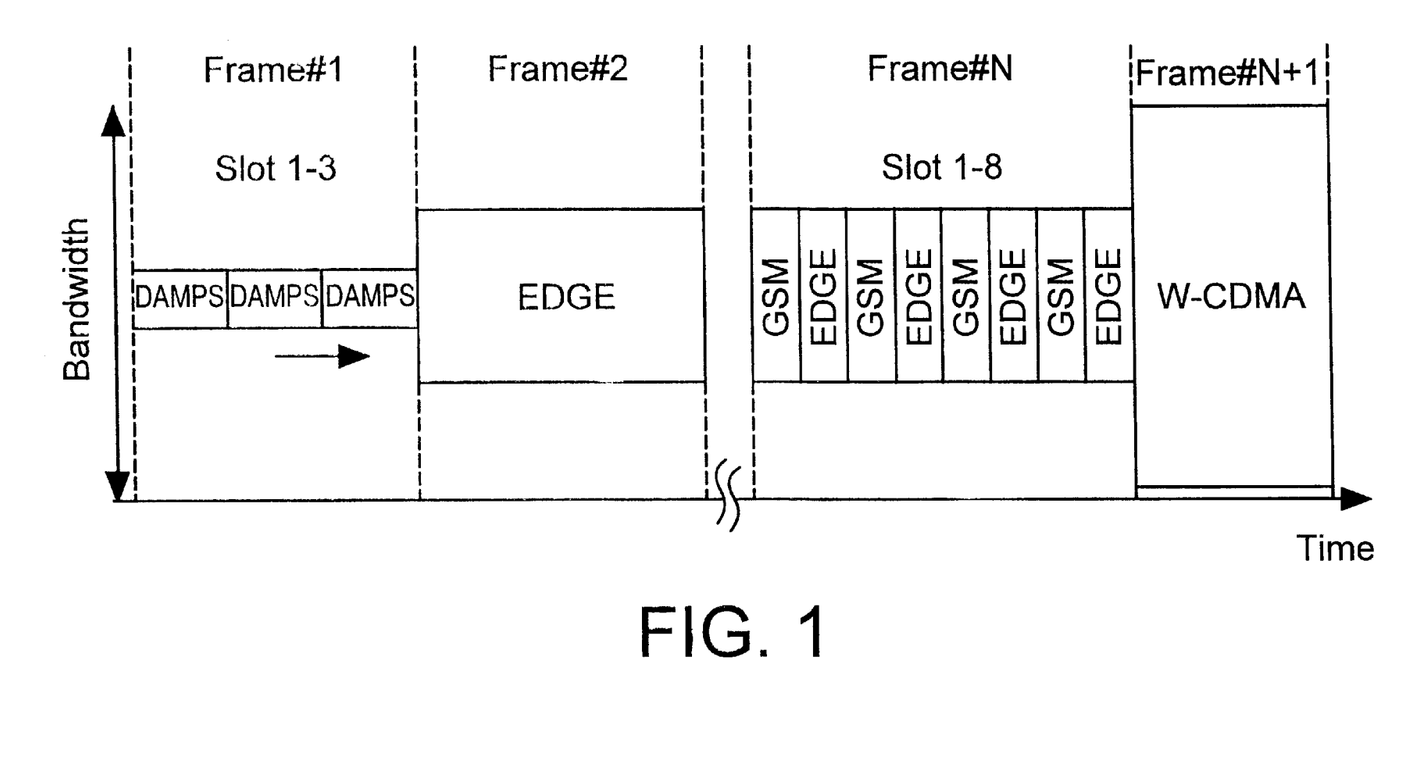
FIG. 1 illustrates the dynamic allocation of a plurality of different standards over time on a frame-by-frame or slot-by-slot basis.

FIG. 1 illustrates the dynamic allocation of a plurality of different standards over time on a frame-by-frame or slot-by-slot basis. As illustrated, all three slots of the first exemplary frame (i.e., Frame #1) are allocated to Digital American Mobile Phone System (DAMPS) transmissions which require only a small amount of bandwidth. The entire second exemplary frame is dedicated to EDGE transmissions which, as illustrated, have a higher bandwidth requirement than the DAMPS transmissions. The time slots of the Nth exemplary frame are allocated to both EDGE and Global Systems for Mobile communication (GSM) transmissions while the N+1 exemplary frame is allocated to wideband Code Division Multiple Access (CDMA) transmissions. As evident from FIG. 1, future systems will need to be able to support a plurality of different standards having different bandwidth requirements.

Figure 2:
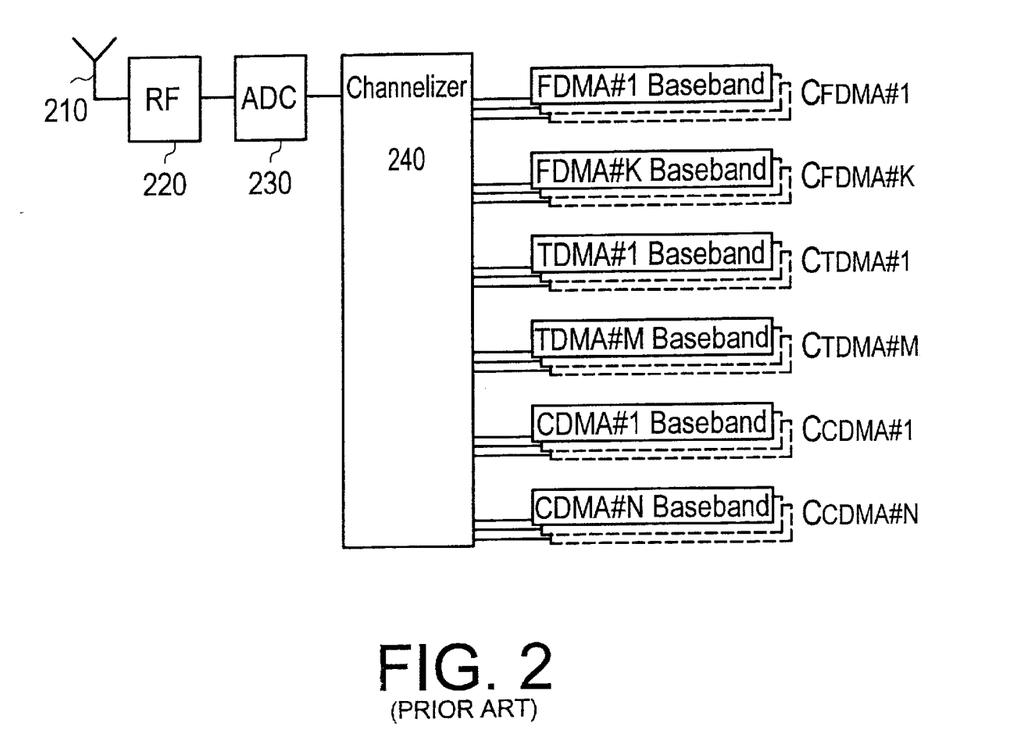
FIG. 2 illustrates a conventional base station receiver architecture including a digital channelizer able to support a number of different standards having a different number of channels.

FIG. 2 illustrates a conventional base station receiver architecture including a digital channelizer able to support a number of different standards (e.g., FDMA#1 . . . K, TDMA#1 . . . M, CDMA#1 . . . N), each having a different number of channels, $C_{X\#Y}$ (where X is the standard and Y is the number of carriers). As illustrated, the conventional base station receiver architecture comprises an antenna 210 that receives a Radio Frequency (RF) signal and transfers the signal to a RF front end 220 where it is down-converted to an intermediate frequency (IF). The RF front end 220 consists of such components as Low Noise Amplifiers (LNAs), filters and mixers. The IF signal is then converted to a digital signal via an Analog-to-Digital Converter (ADC) 230.

In order to achieve dynamic flexibility, the conventional base station may employ a digital channelizer 240 and channelizer algorithm. An exemplary channelizer/de-channelizer algorithm is the Modified Fast Convolution (MFC) algorithm which is described in detail in copending, commonly assigned, U.S. patent application Ser. No. 09/156,630, filed Sep. 18, 1998, and Swedish Patent No. 9802050-7 to Richard Hellberg, both of which are incorporated by reference herein. The function of a channelizer utilizing this algorithm is to filter out each channel sufficiently well so that signals at other frequencies do not interfere with the desired signal. The result is a band-limited signal that can be fed to a baseband processor (not shown) such as a rake detector for CDMA-based systems or an equalizer for TDMA-based systems.

The channelizer/de-channelizer algorithm described in U.S. patent application Ser. No. 09/156,630 is suitable for such channelization tasks as dynamically allocating parameters (e.g., filter parameters and data rates of different standards) and handling a varying number of channels and different standards having varying bandwidth requirements. While the channelizer/de-channelizer algorithm is both flexible and versatile, there is a need for a suitable hardware implementation for this algorithm that retains the algorithm's flexibility and versatility, while at the same time does not introduce high computational costs or lead to a substantial increase in hardware.

Figure 3:
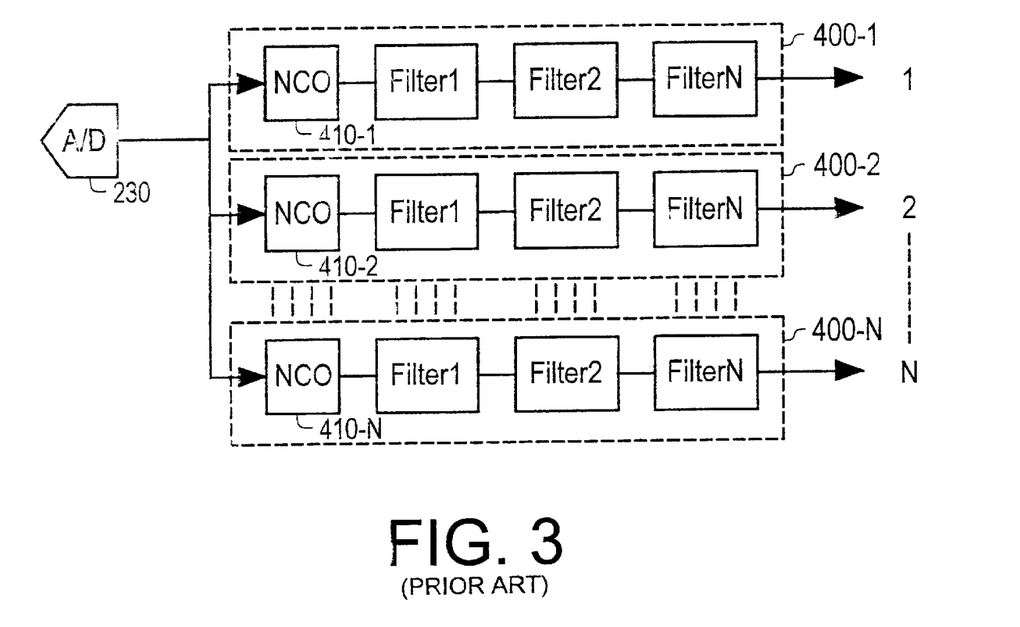
FIG. 3 illustrates a typical hardware architecture for a digital channelizer.

FIG. 3 illustrates a typical hardware architecture for a digital channelizer. As illustrated, the digital channelizer comprises a number of different processing chains 400-1 to 400-N, each dedicated to one of a plurality of channels 1–N (N is generally a small number, such as 4). Each processing chain comprises a Numerically-Controlled Oscillator (NCO) and a group of cascaded digital filters. In operation, data from the ADC 230 for a first channel (e.g., Channel 1) is fed into the processing chain of the digital channelizer that is associated with the first channel, namely processing chain 400-1. NCO 410-1 down-converts the received frequency to a baseband frequency and generates I and Q components of the signal. The I and Q components are then fed into a data stream oriented set of cascaded digital filters. The cascaded filters are generally of different types, typically Cascaded Integrator-Comb (CIC), halfband or Finite Impulse Response (FIR) filters. The different filters have programmable parameters as filter coefficients, gain and decimation factors. The I and Q results are fed from the Nth filter of the first chain 400-1 to a baseband processor (not shown). One skilled in the art will appreciate that the other processing chains operate in a similar manner.

A digital channelizer or de-channelizer that is based on data stream processing on a per channel basis, such as the one illustrated in FIG. 3, will have limited flexibility within each individual channel. The computing resources for each channel is determined by the sum of all the different standard requirements for each individual module in the chain. Each individual module in the chain has to be specified for the standard that for that specific module have the toughest requirements. This means that the whole chain has to be over-specified to support all possible standards, resulting in overhead in silicon area and higher power dissipation. Additionally, since the number of channels is fixed (i.e., fixed to the number of processing chains supported by the channelizer), the system becomes inefficient in those situations where the number of channels needed is different from the fixed number supported by the digital channelizer.

There exists a need for a digital channelizer/de-channelizer that is able to dynamically adjust to continuously changing conditions without a substantial increase in computational cost or hardware.

SUMMARY

The present invention provides a digital channelizer/de-channelizer architecture that, with a minimum amount of hardware, is capable of dynamically adapting to changing system requirements. According to exemplary embodiments of the present invention, the digital channelizer/de-channelizer, which is applied with a modified fast convolution algorithm, includes a plurality of dedicated, optimized, pipeline modules that may be dynamically adjusted for handling different bandwidths, a flexible number of channels, simultaneous multiple standards and a dynamic allocation of channels and standards.

BRIEF DESCRIPTION OF THE DRAWINGS

The above objects and features of the present invention will be more apparent from the following description of the preferred embodiments with reference to the accompanying drawings, wherein.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 4:
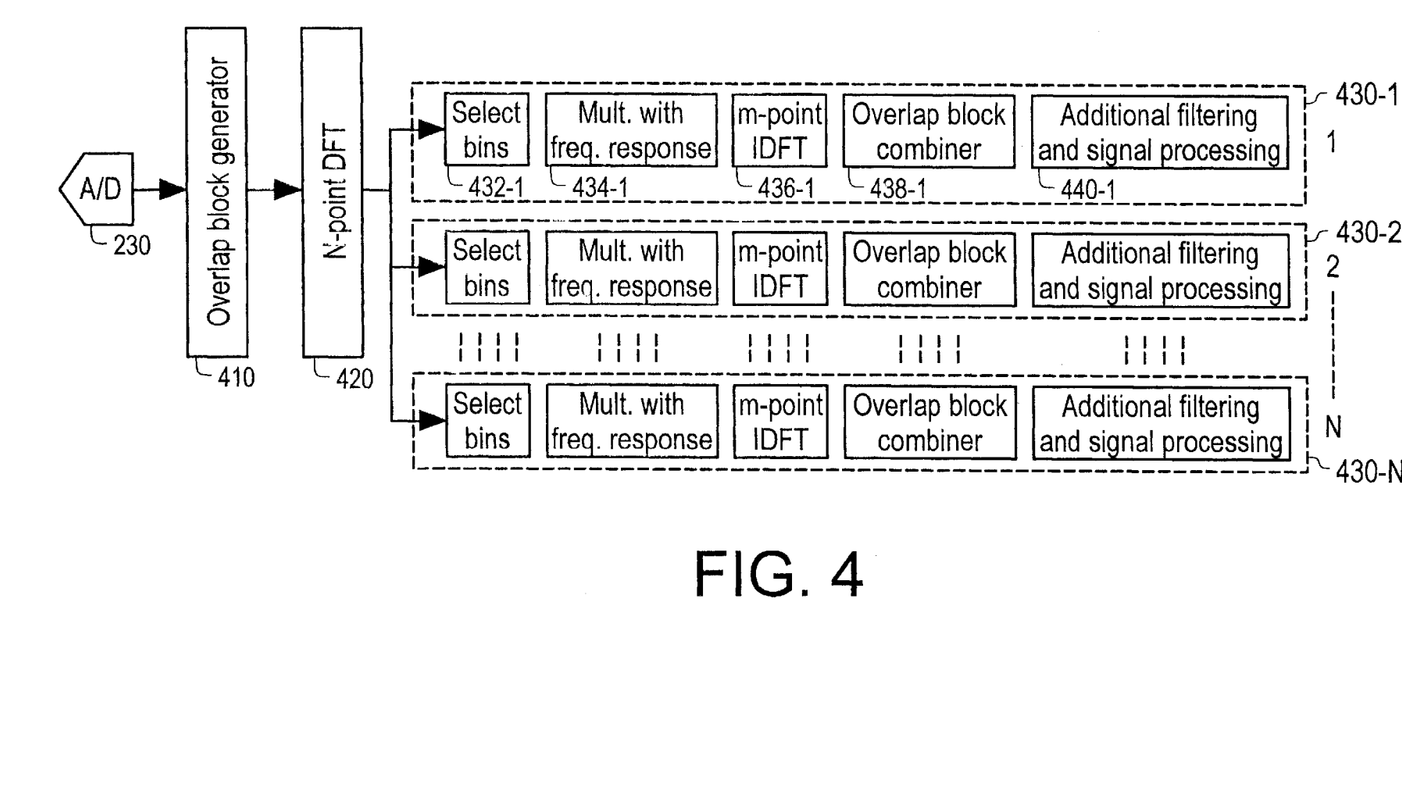
FIG. 4 illustrates the MFC algorithm being applied to a conventional, data stream, digital channelizer.

FIG. 4 illustrates the MFC algorithm being applied to a conventional, data stream, digital channelizer. In FIG. 4, the digital channelizer comprises an overlap block generator 410, a N-point Discrete Fourier Transform (DFT) 420 and a plurality of channel specific processing chains 430-1 to 430-N. Each of the channel-specific processing chains is similarly formed and tailored to the requirements of the chain's associated channel. Processing chain 430-1, for example, comprises a select bins block 432-1, a multiplier block 434-1 that multiplies n data with n coefficients, a m-point Inverse Discrete Fourier Transform (IDFT) 436-1 where the values of n and m may be different and flexible for each individual packet and channel, an overlap block combiner 438-1 and an additional filtering and signal processing block 440-1.

In operation, the ADC 230 provides a stream of digital data to the overlap block generator 410 where blocks of data are formed. The resulting blocks are then input into the DFT algorithm. The DFT algorithm is completed in block 420. The result of the DFT processing is transferred to the specific processing chain corresponding to the channel on which the signals were received. For example, if the signals were received on channel 1, the N-point DFT processing block would transfer the results to processing chain 430-1. As a result of DFT processing, the output of the DFT is generally not in the correct order. Therefore, the bin select block 432-1 compensates for this by reordering the output sequence and only selecting those bins that are needed. The number of bins needed depends on the number of filter coefficients.

The selected bins are multiplied with the filter frequency coefficients in multiplier block 434-1. An IDFT 436-1 is then completed on the result of the previous multiplication. The blocks output from the IDFT 436-1 are transferred to the overlap block combiner 438-1 where the blocks are combined. The combined blocks are transferred to block 440-1 where additional filtering and signal processing are performed. Enhancements to the above-described channelizer operation have been described in copending, commonly assigned U.S. patent application Ser. No. 09/163,298, filed Sep. 30, 1998, and incorporated by reference herein.

In order to implement the above-described channelizer, one processing chain is needed for every channel that is associated with a particular base station. It will be appreciated that as the number of channels supported by the base station increases, the amount of hardware that will be needed for handling those channels becomes increasingly large thereby increasing the computational cost and overall power consumed by the system. Moreover, since the digital channelizer architecture is based on data stream processing on a per channel basis, the channelizer has limited flexibility. This is due to the fact that each individual block of the processing chain has to be specified for the standard that for that specific block has the toughest requirements. As a result, the entire processing chain is often over-specified in order to support all possible standards.

The present invention overcomes the above-identified deficiencies in the art by providing a digital channelizer/de-channelizer architecture that is both flexible and efficient and does not substantially increase the hardware requirements of the system. According to exemplary embodiments of the present invention, a digital channelizer/de-channelizer architecture is set forth that is based on pipeline processing. The channel-specific operations of the channelizer/de-channelizer algorithm are performed by dedicated hardware modules that may be individually tailored to the standard and bandwidth requirements of the system.

Figure 5:
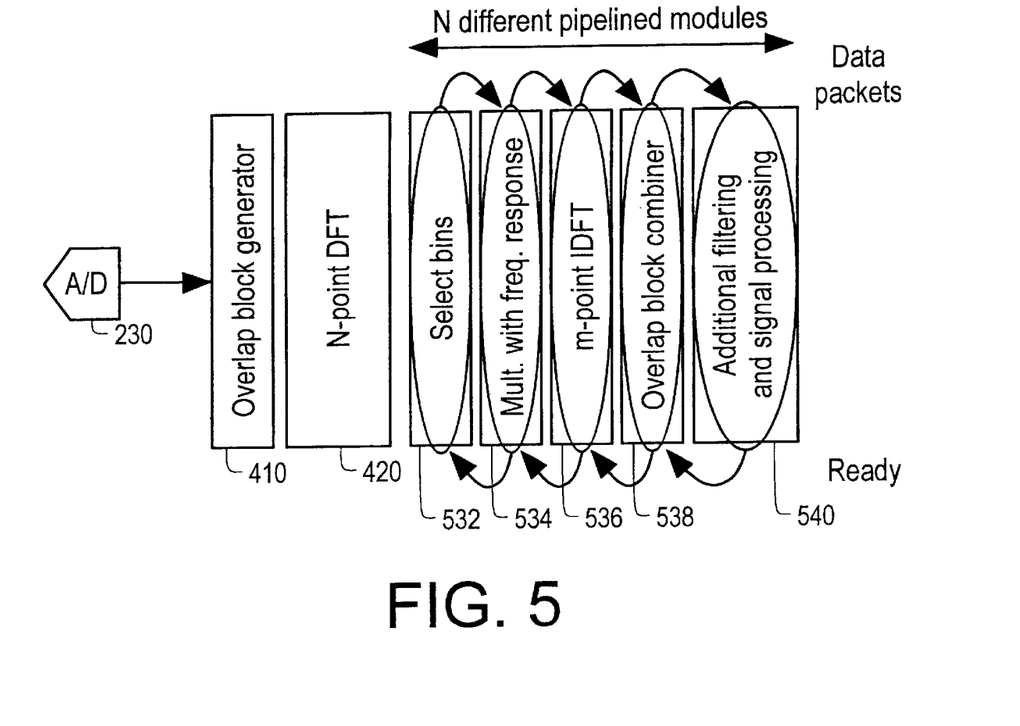
FIG. 5 illustrates the MFC algorithm being applied to an exemplary pipelined digital channelizer architecture according to an embodiment of the present invention.

FIG. 5 illustrates the MFC algorithm being applied to an exemplary pipelined digital channelizer architecture according to an embodiment of the present invention. The exemplary pipelined digital channelizer architecture comprises an overlap block generator 410, a N-point DFT 420 and a single pipelined processing chain. The pipelined processing chain comprises a select bins module 532, a multiplier block 534 that multiplies n data with n coefficients, a m-point IDFT 536 where the values of n and m may be different and flexible for each individual packet and channel, an overlap block combiner 538 and an additional filtering and signal processing module 540. As illustrated, packets of data belonging to the different channels are sent from one hardware module to the next as the processing of the previous packet is ready. The term 'packet' refers to hereinafter as a signal belonging to both a certain channel and a certain signal block generated by the overlap block generator 410.

Figure 6:
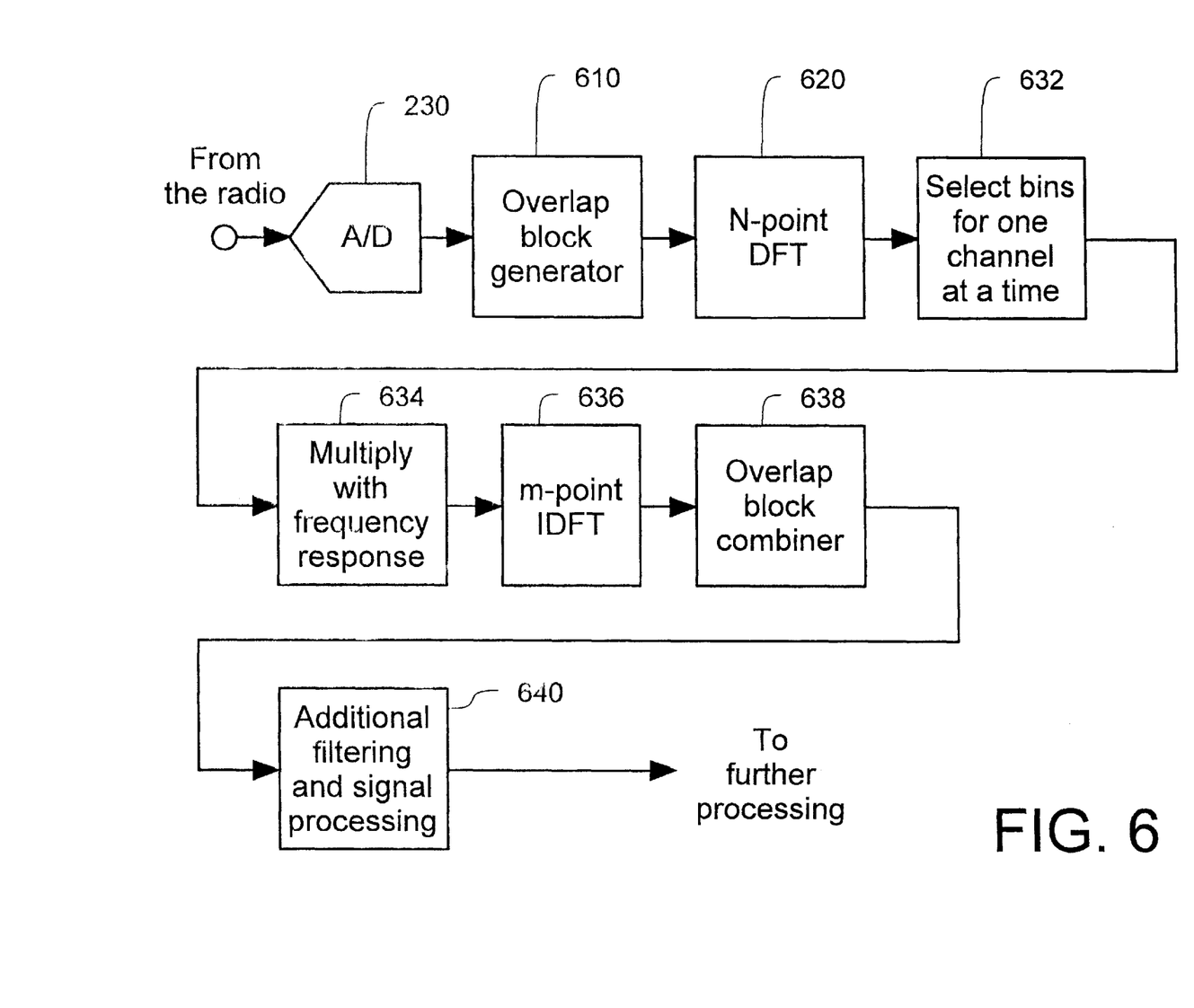
FIG. 6 illustrates the flow of packets through the exemplary pipelined digital channelizer architecture of FIG. 5.

The algorithm performs fast convolution with decimation and frequency transposition, with subsequent additional filtering and other signal processing. A functional schematic of the algorithm is shown in FIG. 6. The overlap block generator module 610 receives digital signals from the ADC 230, processes the signals to form blocks of data and transfers the data blocks to the N-point DFT module 620. The N-point DFT module 620 is a hardware module specialized in generating large discrete Fourier transforms of overlapping signal blocks. The rest of the modules of the digital channelizer, as one skilled in the art will appreciate, generally operate on a smaller number of samples than this large DFT processor, since the signal output from the N-point DFT 620 is immediately decimated in the 'select bins for one channel at a time' module 632.

The pipelined processing of signal packets in the digital channelizer starts with the 'select bins for one channel at a time' module 632 which selects a portion of the bins (samples in the frequency domain) coming from the large DFT that belongs to one specific channel. These selected bins are sent as a packet, together with control information, to the next module in the chain, the 'multiply with frequency response' module 634. The packet is then sent to the 'm-point IDFT' module 636 where it is subjected to an inverse discrete Fourier transformation. The signal in the packet is then patched together with the previous packet(s) in the 'overlap block combiner' module 638. The newly formed segment of the signal belonging to one channel is thereafter sent to the 'additional signal processing' module 640, where the filtering of the channel and other signal processing operations are completed. The above-described operations are performed on different packets simultaneously, with packets belonging to different channels being processed concurrently in different hardware modules. This is shown conceptually in FIG. 7.

Figure 7:
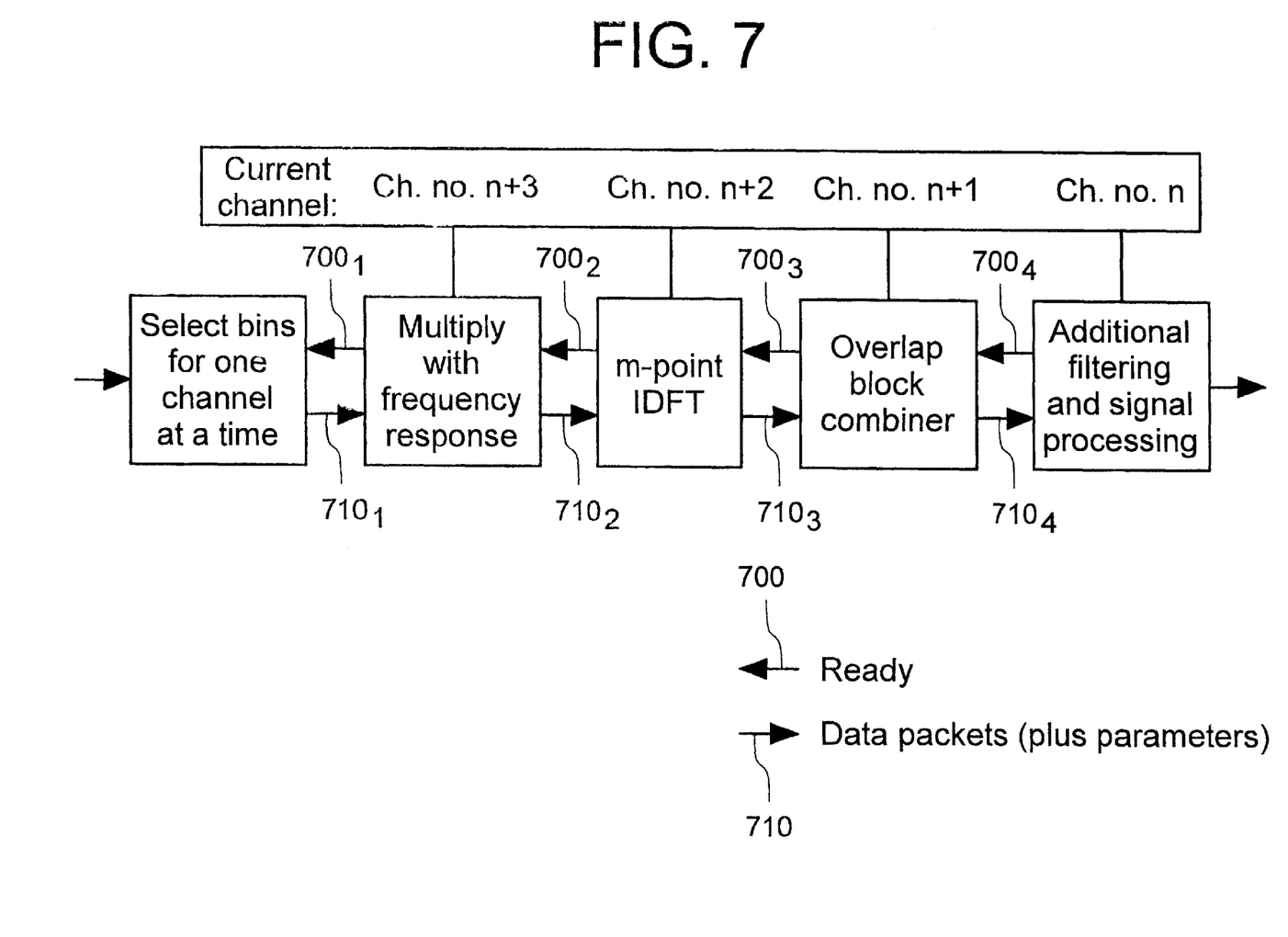
FIG. 7 illustrates the flow of packets and control signals through an exemplary pipeline chain of the digital channelizer of the present invention.

As illustrated in FIG. 7, when one module has finished processing a packet, it can simply signal the previous module in the chain that it is ready to start working on the next packet. This is illustrated in FIG. 7 by arrows $700_1$–$700_4$. The ready indication, as will be appreciated, includes such things as control signals and/or parameters for previous modules. In response to the ready indication, the previous module sends its processed packet plus control signals and/or parameters for subsequent modules, if it is ready. This is illustrated in FIG. 7 by the arrows $710_1$–$710_4$. Otherwise, the previous module knows that the packet can be sent as soon it is ready. As alternatives to the above-described packet transfer method, a controller may be used to schedule the work of each individual module or packets can be automatically transferred from a previous module to a subsequent module after a predetermined period of time. Combinations of these methods can also be used.

The pipeline modules of the present invention can either work iteratively on a packet or perform operations on data passing through the module. It will be appreciated that some of the modules need to remember state variables from the last processed signal packet. This is accomplished by storing the state variables in registers, or memory areas, which are set up for each channel. Moreover, since the packets belonging to different channels are processed in each of the different pipeline modules, each module is capable of dynamically adapting to varying system requirements. The parameters can either be stored in a memory location belonging to a hardware module, or be sent with the packets as they are being processed. As such, the pipeline modules can handle channels having different parameters such as bandwidth, filter characteristics, channel frequency and decimation/interpolation factors. It will be appreciated that, in those situations, for example, when the modules exchange a lot of control signals and/or parameters or when they share a common memory, two or more modules may be grouped together.

The hardware modules of the present invention perform one or at least a few types of operations each. As such, the modules can be optimized to perform their specific type of operation very efficiently. The only 'soft' feature needed is the ability to have different parameters for the operations. As set forth above, a memory location can be associated with each hardware module to store these different parameters.

It will be appreciated that, as a result of the pipeline configuration of the present invention, the order of the packets sent through the pipelined processing chain can be optimized for different purposes. A certain channel could be subject to more strict latency (delay) requirements, for instance, and should therefore be processed first. The order in which narrowband and wideband channels are processed can also be optimized so that the hardware modules are used with as little delay as possible, which increases the maximum number of channels that can be processed.

The packets have been described thus far as representing one channel and a certain signal block generated by the overlap block generator. One skilled in the art will appreciate that, as an alternative, the packets could instead represent several channels at a time or several signal blocks at a time, or both. The packets could also represent only a part of a channel or a part of a signal block when processed in some of the dedicated hardware modules.

Figure 8:
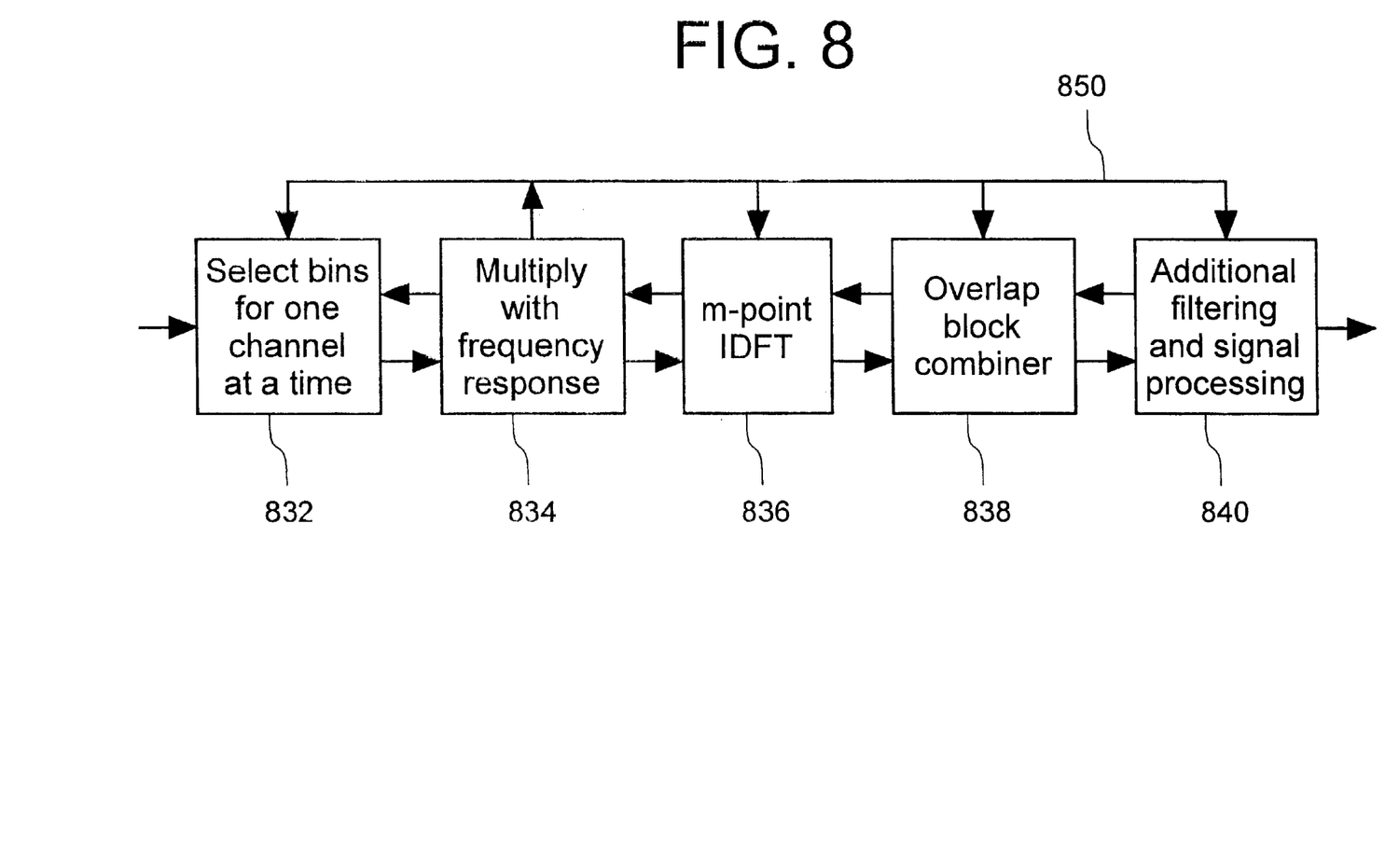
FIG. 8 illustrates a pipeline configuration where one of the pipeline modules serves as a master according to an alternative embodiment of the present invention.

FIG. 8 illustrates yet a further embodiment of the present invention in which one of the plurality of pipeline modules serves as a master module that controls the processing of the other modules in the pipeline. In FIG. 8, it is assumed that the multiplier module 834 has been designated as the master module. It will be appreciated that the choice of the multiplier module 834 as the master module is exemplary and that another module in the pipeline could alternatively be designated as the master. As the master, the multiplier module 834 generates control signals and/or parameters for the other modules (i.e., the select bins module 832, the m-point IDFT 836, the overlap block combiner 838 and the additional filtering and signal processing module 840) in the pipeline and transfers these control signals and/or parameters via a common bus 850. As such, the multiplier module 834 sends control signals and/or parameters together with data to be used by several previous or subsequent processing blocks.

Figure 9:
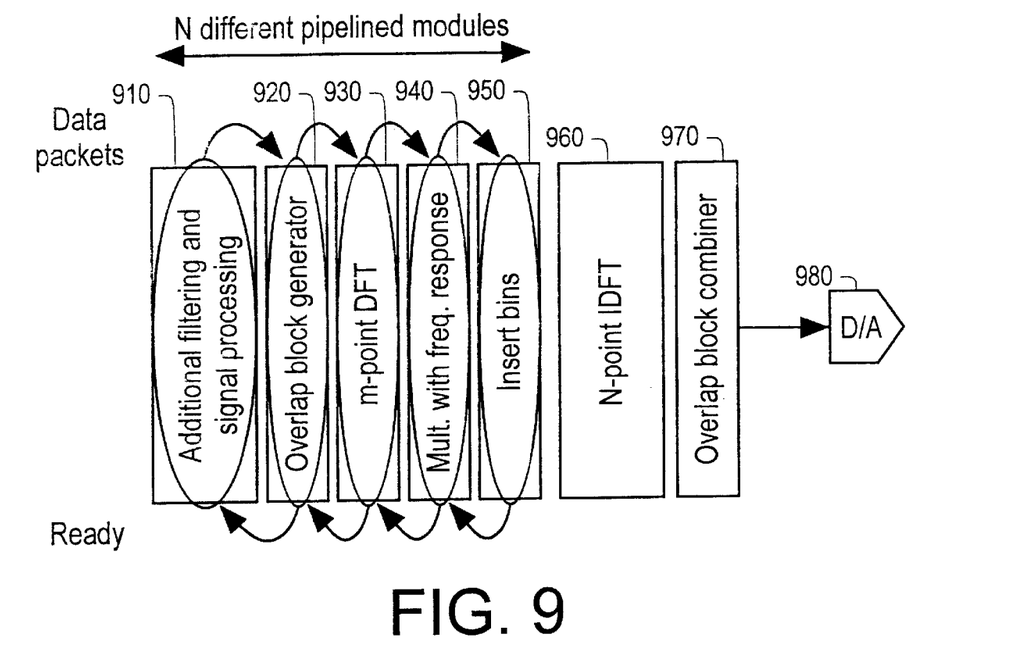
FIG. 9 illustrates the MFC algorithm being applied to an exemplary pipelined digital de-channelizer architecture according to an embodiment of the present invention.

While the above-described embodiments set forth a channelizer implementation, one skilled in the art will appreciate that the present invention is equally applicable to de-channelizer implementations. This is shown conceptually in FIG. 9. FIG. 9 illustrates the MFC algorithm being applied to an exemplary pipelined digital de-channelizer architecture according to an embodiment of the present invention. The de-channelizer architecture comprises a pipeline chain including an additional filtering and signal processing module 910, an overlap block generator 920, a m-point DFT module 930, a multiplier block 940 that multiplies n data with n coefficients, an insert bins module 950, a N-point IDFT 960 and an overlap block combiner 970. As illustrated, the de-channelizer architecture is basically the reverse of the channelizer architecture. Moreover, as set forth above, the values of m and n may be different and flexible for each individual packet and channel.

Similar to the operation of the digital channelizer described above, each pipeline module of the exemplary digital de-channelizer illustrated in FIG. 9 is capable of being dynamically adapted to changing system requirements. As a result, the hardware for implementing such a de-channelizer is minimized while at the same time providing for a flexible and efficient system.

As a result of the pipelined nature of the channelizer/de-channelizer of the present invention, the channelizer/de-channelizer is capable of handling a flexible number of channels, flexible channel bandwidths, individual channel parameter settings and simultaneous multiple standards, all with a minimum amount of hardware and low power consumption. Moreover, the present invention allows for a dynamic allocation of different standards and a varying number of channels.

The foregoing has described the principles, preferred embodiments and modes of operation of the present invention. However, the invention should not be construed as being limited to the particular embodiments discussed above. For example, while the above-described embodiments set forth the use of a single pipeline chain, one skilled in the art will appreciate that the channelizer/de-channelizer could comprise multiple pipeline chains so as to allow for parallel processing of signals. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A channelizer applied with a modified fast convolution algorithm, said channelizer comprising:

an overlap block generator for forming blocks of data from a stream of digital data received from an analog-to-digital converter;

an N-point Discrete Fourier Transform (DFT) processor that receives the data blocks from the overlap block generator and performs an N-point DFT on the data blocks;

a block selection module that receives the processed data blocks from the DFT processor, and sequentially selects and forwards portions of the blocks for further processing, each of said forwarded portions comprising data blocks associated with a single channel at a time and an indication of the associated channel; and a plurality of pipelined processing modules that receives the forwarded portions of single-channel data blocks from the block selection module, and sequentially processes the data blocks in each of the pipelined processing modules, each of the pipelined processing modules being associated with a memory for storing parameters defined for a plurality of different channels, and each pipelined processing module including:

means for retrieving the stored parameters for each portion of data blocks based upon the indication of the channel associated with each received portion of data blocks;

means for processing each portion of data blocks in accordance with the retrieved parameters; and means for transferring processed data blocks to a next pipelined processing module in the plurality of modules;

whereby, each of the pipelined processing modules retrieves the defined parameters for the data blocks received, processes the data blocks independently from any processing being simultaneously performed by other pipelined modules, and forwards the processed data blocks to the next pipelined processing module, thereby enabling the channelizer to dynamically adapt to different channel parameters with a single pipeline of processing modules.

2. The channelizer of claim 1 wherein the plurality of pipelined processing modules includes a multiplier, means for performing a m-point Inverse Discrete Fourier Transform, an overlap block combiner, and a module for performing filtering and signal processing.

3. The channelizer of claim 1 wherein a preceding module transfers a processed data block to a subsequent module in response to a control signal transferred from the subsequent module.

4. The channelizer of claim 1 wherein a preceding module transfers a processed data block to a subsequent module in response to a control signal transferred from a pipeline controller.

5. The channelizer of claim 1 wherein a preceding module transfers processed data block to a subsequent module after a predetermined time interval.

6. The channelizer of claim 1 wherein the channelizer dynamically adapts to changing bandwidths, changing channel parameter settings, changing standards, and changing numbers of channels.

7. The channelizer of claim 1 further comprising at least a second plurality of pipelined processing modules positioned to receive selected processed data blocks from the N-point DFT processor.

8. The channelizer of claim 1 wherein one of the plurality of pipelined processing modules serves as a master module that controls other pipelined processing modules by sending at least one of control information, parameters, and data to the other modules.

9. The channelizer of claim 1 further comprising a second memory associated with the plurality of pipelined processing modules, said second memory storing state variables resulting from the processing, by a particular one of the pipelined processing modules, of a portion of data blocks associated with a particular channel, and said state variables being accessible by the particular module when the same or another portion of data blocks associated with the particular channel is ready for processing in the particular module.

10. A method of executing a modified fast convolution algorithm applied to a channelizer, said method comprising the steps of:

processing a received data stream by an overlap block generator to form blocks of data;

processing the blocks of data with an N-point Discrete Fourier Transform (DFT) to form bins;

sequentially selecting and forwarding bins to a plurality of pipelined processing modules for further processing, each of the forwarded bins being associated with a single channel at a time, and including an indication of the associated channel;

storing in a memory associated with the pipelined processing modules, parameters defined for a plurality of different channels; and sequentially processing the bins with the plurality of pipelined processing modules, said step of sequentially processing including, in each pipelined processing module:

determining the channel associated with a received bin;

retrieving the stored parameters for the associated channel from the associated memory; and processing each bin in accordance with the retrieved parameters;

whereby, each of the pipelined processing modules selects the defined parameters for the bins received, processes the bins independently from any processing being simultaneously performed by other pipelined modules, and forwards the processed bins to the next pipelined processing module, thereby enabling the channelizer to dynamically adapt to different channel parameters with a single pipeline of processing modules.

11. The method of claim 10 wherein the step of processing each bin in accordance with the retrieved parameters includes the steps of:

multiplying the received bin with frequency filter coefficients to form data points;

performing an m-point Inverse Discrete Fourier Transform (IDFT) on the data points;

processing the data output from the m-point IDFT with an overlap block combiner to form a digital data stream; and performing additional filtering and signal processing on the digital data stream.

12. The method of claim 10 wherein the step of sequentially processing the bins includes transferring a processed bin from a preceding module to a subsequent module in response to a control signal transferred from the subsequent module.

13. The method of claim 12 wherein the step of sequentially processing the bins includes transferring a processed bin from a preceding module to a subsequent module in response to a control signal transferred from a pipeline controller.

14. The method of claim 10 wherein the step of sequentially processing the bins includes transferring a processed bin from a preceding module to a subsequent module after a predetermined time interval.

15. The method of claim 10 further comprising the steps of:

storing, in a second memory associated with the pipelined processing modules, state variables resulting from the processing, by a particular one of the pipelined processing modules, of a bin associated with a particular channel, and accessing the stored state variables by the particular module when the same or another bin associated with the particular channel is ready for processing in the particular module.

16. The method of claim 10 wherein the step of sequentially selecting and forwarding bins to the plurality of pipelined processing modules includes the steps of:

determining a priority of each bin; and selecting and forwarding bins with a higher priority first.

17. The method of claim 10 wherein the step of sequentially selecting and forwarding bins to the plurality of pipelined processing modules includes the steps of;

determining a latency requirement for the channel associated with each bin; and selecting and forwarding bins associated with a channel having a more strict latency requirement first.

18. The method of claim 10 wherein the step of sequentially selecting and forwarding bins to the plurality of pipelined processing modules includes the steps of:

determining which channels are narrowband and which channels are wideband channels; and determining an order for processing the associated bins that results in a minimum processing time within the plurality of pipelined processing modules.

19. A de-channelizer applied with a modified fast convolution algorithm, said de-channelizer comprising:

a plurality of pipelined processing modules that receives channelized blocks of data associated with different channels, and sequentially processes the data blocks in each of the pipelined processing modules, each of the pipelined processing modules being associated with a memory for storing parameters defined for a plurality of different channels, and each pipelined processing module including means for selecting the stored parameters for processing each portion of data blocks based upon the channel associated with each received portion of data blocks;

an N-point Inverse Discrete Fourier Transform (IDFT) processor that receives the data blocks from the pipelined processing modules and performs an N-point IDFT on the data blocks;

a block insertion module that sequentially receives the processed data blocks from the pipelined processing modules and inserts the received data blocks into the IDFT processor; and an overlap block combiner for forming a stream of digital data from blocks of data received from the N-point IDFT and providing the stream to a digital-to-analog converter;

whereby, each of the pipelined processing modules selects the defined parameters for the data blocks received, processes the data blocks independently from any processing being simultaneously performed by other pipelined modules, and forwards the processed data blocks to the next pipelined processing module, thereby enabling the de-channelizer to dynamically adapt to different channel parameters with a single pipeline of processing modules.

20. The de-channelizer of claim 19 wherein the plurality of pipelined processing modules includes a module for performing filtering and signal processing, an overlap block generator, means for performing a m-point Discrete Fourier Transform (DFT), and a multiplier.

21. The de-channelizer of claim 19 wherein a preceding module transfers a processed data block to a subsequent module in response to a control signal transferred from the subsequent module.

22. The de-channelizer of claim 21 wherein a preceding module transfers a processed data block to a subsequent module in response to a control signal transferred from a pipeline controller.

23. The de-channelizer of claim 19 wherein a preceding module transfers a processed data block to a subsequent module after a predetermined time interval.

24. The de-channelizer of claim 19 wherein the channelizer dynamically adapts to changing bandwidths, changing channel parameter settings, changing standards, and changing numbers of channels.

25. The de-channelizer of claim 19 further comprising at least a second plurality of pipelined processing modules positioned to receive and process channelized data blocks and provide them to the N-point IDFT processor.

26. The de-channelizer of claim 19 wherein one of the plurality of pipelined processing modules serves as a master module that controls other pipelined processing modules by sending at least one of control information, parameters, and data to the other modules.

27. A method of executing a modified fast convolution algorithm applied to a de-channelizer, said method comprising the steps of:

storing in a memory associated with a plurality of pipelined processing modules, parameters defined for a plurality of different channels;

sequentially processing a received digital data stream with a plurality of pipelined processing modules to form bins, said step of sequentially processing including, in each pipelined processing module:

determining the channel associated with a received data stream;

retrieving the stored parameters for the associated channel from the associated memory; and processing each data stream in accordance with the retrieved parameters to form bins;

processing the bins with a N-point Inverse Discrete Fourier Transform (IDFT) to form data blocks;

combining the data blocks in an overlap block generator; and providing the combined data blocks to a digital-to-analog converter;

whereby, each of the pipelined processing modules selects the defined parameters for the bins received, processes the bins independently from any processing being simultaneously performed by other pipelined modules, and forwards the processed bins to the next pipelined processing module, thereby enabling the de-channelizer to dynamically adapt to different channel parameters with a single pipeline of processing modules.

28. The method of claim 27 wherein the step of processing each data stream in accordance with the retrieved parameters includes the steps of:

performing filtering and signal processing on the digital data streams;

processing said filtered and signal processed streams with an overlap block generator to form blocks of data;

performing a m-point Discrete Fourier Transform (DFT) on the blocks of data to form bins;

multiplying said bins with frequency filter coefficients; and inserting said multiplied bins for processing with said N-point IDFT.

29. The method of claim 27 wherein the step of sequentially processing a received data stream includes transferring processed data from a preceding module to a subsequent module in response to a control signal transferred from the subsequent module.

30. The method of claim 29 wherein the step of sequentially processing the bins includes transferring a processed bin from a preceding module to a subsequent module in response to a control signal transferred from a pipeline controller.

31. The method of claim 27 wherein the step of sequentially processing the bins includes transferring a processed bin from a preceding module to a subsequent module after a predetermined time interval.

* * * * *